Patented July 7, 1953

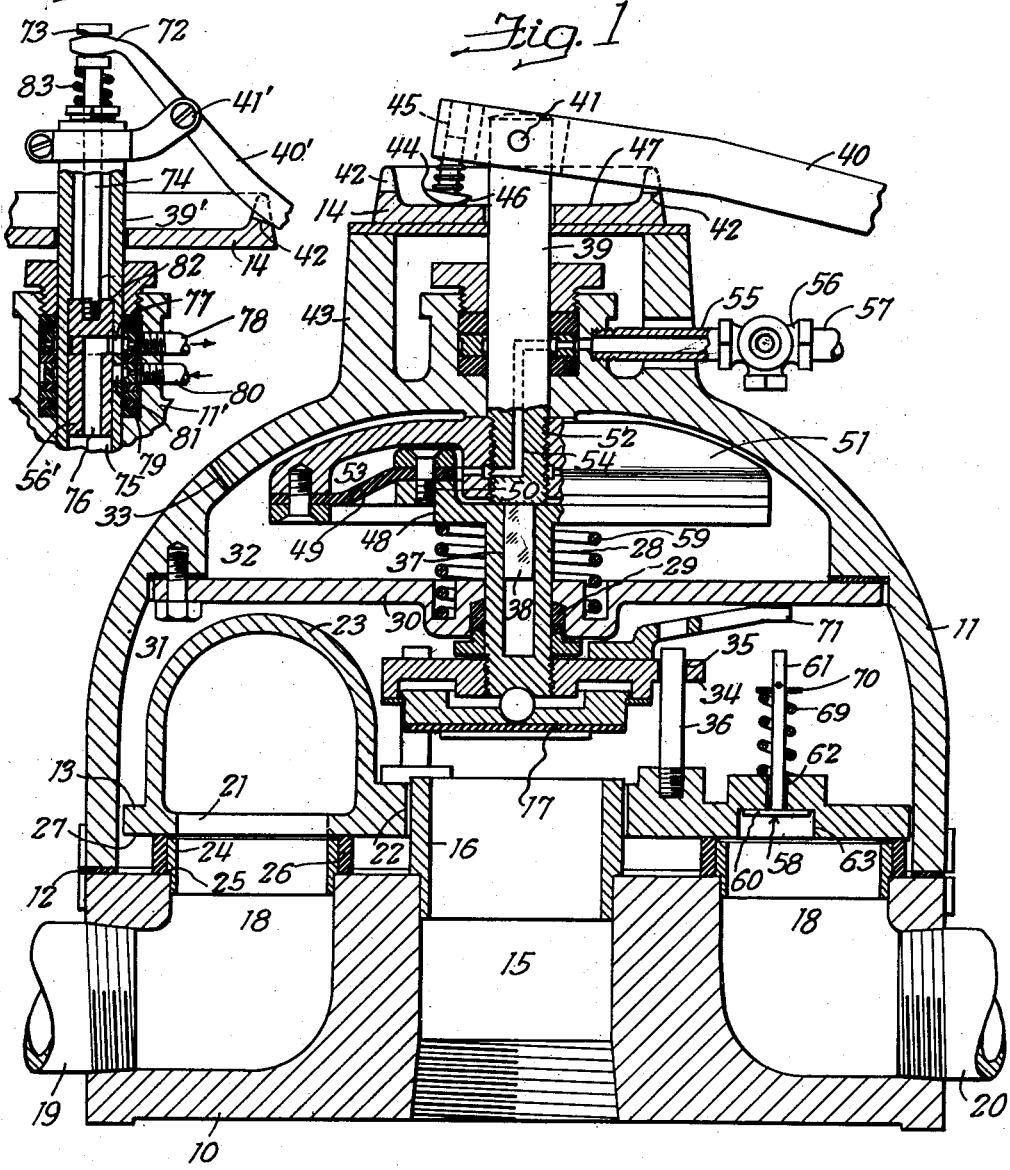

2,644,484

UNITED STATES PATENT OFFICE 2,644,484

MULTIPORT VALVE

Harry Mansen, Barrington, Ill., assignor to Elgin Softener Corporation, Elgin, Ill., a corporation of Illinois Application December 29, 1944, Serial No. 570,271

16 Claims. (Cl. 137—627)

1

This invention relates to multiport valves of the type used for controlling the flow of water and brine through a zeolite softener in the phases of softening, backwashing, brining, and rinsing.

In multiport valves, the shifting of the stem plate from one position to another results in a violent water-hammer unless the flow of incoming water is shut off, and furthermore, unless provision is made for relief of hydraulic pressure from the stem plate preliminary to the shifting thereof, the operation is, of course, rendered more difficult. A shut-off valve and a pressure relief valve have accordingly been provided in certain multiport valves. It is the principal object of my invention to further facilitate the operation of multiport valves by providing a pressure fluid operable diaphragm mechanism, preferably inside the cover of the multiport valve, which is adapted to be actuated by admission of pressure thereto to close the shut-off valve and open the relief valve whenever it is desired to shift the stem plate from one position to another. The diaphragm subjected to water pressure from the supply line is substantially larger in diameter than the shut-off valve, so that the shut-off valve is movable to closed position against the pressure of the incoming water to close the pressure port.

Another object of my invention is to provide a multiport valve of the kind mentioned in which the hand lever for turning the stem plate operates a small pilot valve in the stem to admit water under pressure to the diaphragm chamber preliminary to the turning of the stem plate, the handle being preferably normally locked against turning while disposed in a position wherein the pilot valve relieves such pressure, so that there will be no likelihood of anyone attempting to turn the stem plate before the shut-off valve has been closed and hydraulic pressure on the stem plate has been relieved.

The invention is illustrated in the accompanying drawing, in which—

Fig. 1 is a vertical section through a multiport valve made in accordance with my invention, the valve being shown in normal operating condition with the shut-off valve open and with the diaphragm chamber at atmospheric pressure, and Fig. 2 is a vertical section corresponding to a portion of Fig. 1, illustrating a modified or alternative construction.

Similar reference numerals are applied to corresponding parts in these two views.

Referring first to Fig. 1, the reference numeral 10 designates the stator or body member of a valve on which a cap or cover 11 is suitably secured compressing a gasket 12 therebetween to prevent leakage. The cover encloses the rotor or stem plate 13 which in its three operative positions—"service," "backwash," and "salt wash" or "brine and rinse"—as may be indicated by suitable legends on the index plate 14 on top of the cover, controls the flow of water through the valve by providing a different system of communication between the various ports in the body 10 in each of the three positions. It should be understood that although the valve is one especially designed for use in controlling the flow of water to and from a zeolite water softener, the invention is not to be regarded as limited to that or any other specific application, but is applicable to valves generally.

The body 10 has a central pressure port 15 which communicates with a raw water supply pipe. A valve seat ring 16 is inserted in the port 15 and projects upwardly from the body inside the cover 11 for cooperation with a shut-off valve 17. There are four ports 18 in the body, 90° apart, and at the same radial distance from the central pressure port 15, and these ports communicate with four pipes like those indicated at 19 and 20, two of which extend to and from the opposite ends of a softener tank, while a third is connected to the service system, and the fourth extends to a drain receptacle. The stem plate 13 has at least three ports like the port 21 provided therein, 90° apart, adapted to register with three of the ports 18 in different positions of the stem plate. There is also a central opening 22 in the stem plate which registers with the port 15 in the body member in all positions of the stem plate, and through which the seat ring 16 extends, as shown. Two of the ports 21 in the stem plate are interconnected by a cored passage 23. In the three positions of the stem plate 13, different systems of communication are established between the various ports in the body 10, the one position being the service position, the second position being for backwash, and the third for brining and rinsing.

The ports 18 in the body 10 have rings 24 pressed therein and projecting upwardly from the body a uniform height determined by annular shoulders 25 on the outside thereof engaging the top face of the body. These rings have rubber seal rings 26 surrounding the same and seated on the flat top face of the body with their upper ends projecting slightly beyond the ends of the rings 24 for sealing contact with the flat bottom face 27 of the stem plate 13. The rings 26, therefore, perform the sealing function, while the rings 24 serve positively to limit compression of the rings 26, thus preventing damage thereto. With this arrangement there is no necessity for lifting the stem plate before it is turned from one position to another. The fact that the hydraulic pressure on the stem plate is relieved preliminary to the turning of the stem plate, as will soon appear, greatly reduces the drag which there would otherwise be of the stem plate on the gasket rings 26, and the stem plate can therefore be turned with less effort and with less likelihood of damage to these rings.

The shut-off valve 17, in accordance with my invention, is mounted on the end of a stem 28 that extends through a stuffing box 29 provided in the center of a plate 30 which separates the water pressure chamber 31 in the cover 11 from an atmospheric chamber 32 in the upper portion of the cover. 33 is an air vent provided in the cover communicating with the chamber 32. A plate 34 suitably secured on the lower end of the stem 28 has the shut-off valve 17 rotatably and universally tiltably mounted thereon so as to permit the shut-off valve to adjust itself in relation to the stem 28 and plate 34 for uniform engagement on the seat ring 16. The plate 34, furthermore, has circumferentially spaced holes 35 therein which receive with a free sliding fit pins 36 projecting upwardly from bosses provided on the stem plate. These pins 36 are in parallel relation to one another and fit freely in the holes 35 to maintain a sliding operating connection between the plate 34 and the stem plate 13 in all positions of up and down adjustment of the stem 28. The stem 28 has a square center hole 37 receiving with a close working fit the square lower end portion 38 of the operating stem 39 that is manually rotatable by means of the handle 40. The handle 40 is pivotally connected to the stem 39, as indicated at 41, and is normally held in locking engagement in any one of a plurality of notches 42 provided in circumferentially spaced relation in the index plate 14, the latter being suitably secured on supports 43 projecting upwardly from the top of the cover 11. A spring pressed plunger 44, working in a vertical hole 45 in the inner end portion of the handle 40 and having the rounded head end 46 thereof slidable freely on the flat top surface 47 of the index plate, serves to hold the handle 40 releasably in its adjusted positions, and it should be obvious that if the notches 42 are angularly spaced to correspond with the three or more operative positions of the stem plate 13, the latter can accordingly be locked by means of the handle 40 in any one of these positions by engagement of the handle in the proper notch 42.

A pressure plate 48 is formed integral with the upper end of the stem 28 and is clamped to the inner marginal portion of a flexible diaphragm 49, as indicated at 50, the outer marginal portion of the diaphragm being clamped to a back plate 51 that is fixed to the stem 39, as indicated at 52. Water under pressure from the same supply pipe that extends to the pressure port 15 may be admitted to the diaphragm chamber 53 through a passage 54 provided in the stem 39 which communicates at its upper end with a pipe 55 that is arranged to be placed in communication through a three-way valve 56 with a pipe 57 connected to the supply pipe, or opened through said valve 56 to the atmosphere. While I prefer to utilize water under pressure from the supply source, I may more conveniently, in some installations, utilize compressed air, or some other fluid under pressure. Assuming water under pressure from the supply source is supplied through the pipe 57 and the valve 56 is turned to a position establishing communication between the pipe 57 and the diaphragm chamber 53, the stem 28 is immediately forced downwardly under hydraulic pressure to seat the shut-off valve 17 and unseat the pressure relief valve 58, so that the stem plate 13 can be turned easily by means of the hand lever 40. The stem 39 serves to transmit rotation to the stem 28 through the slidable driving connection indicated at 37—38, so that there is no load imposed upon the diaphragm 49. After the stem plate 13 has been shifted to the desired position and the lever 40 has been entered in the notch 42 for that position, the valve 56 is turned to disconnect the diaphragm chamber 53 from the pressure source 57 and open the diaphragm chamber to the atmosphere, whereupon a coiled compression spring 59, compressed between the pressure plate 48 and plate 30, serves to return the pressure plate 48 to the fully retracted position shown, thus opening the shut-off valve 17 and allowing the relief valve 58 to close. The diaphragm 49 is of sufficient diameter in relation to the smaller diameter of the shut-off valve 17 to insure prompt closing of the shut-off valve when water under pressure from the supply source is delivered to the diaphragm chamber 53, but when the diaphragm chamber is opened to the atmosphere the shut-off valve 17 will be caused to open promptly under hydraulic pressure just as it would if there were no spring 59. The purpose of the spring 59 is merely to insure more prompt and complete backing up of the shut-off valve and to insure its staying fully retracted so as to avoid any likelihood of restriction to flow of water through the port 15.

The relief valve 58 is provided in the stem plate 13 and is arranged to be opened automatically in the closing of the shut-off valve 17, whereby to place the chamber 31 inside the cover 11 and all portions of the system communicating therewith at atmospheric pressure by establishing communication therefor with the drain pipe 20. In that way, the stem plate 13 can be turned easily and wear on the seal or gasket rings 26 is reduced to a minimum. The pressure relief valve 58 is of the poppet type having a circular disk head 60 on the lower end of a stem 61 that projects freely through a hole 62 provided in the stem plate. The hole 62 is closed by the head of the valve 58 when it is seated. The valve head is housed within a recess 63 in the bottom of the stem plate 13 and there is, therefore, nothing projecting below the stem plate that might come into contact with the seal rings 26 and interfere with the free turning of the stem plate. Now, assuming the stem plate is in the "service" position shown when the pressure relief valve 58 is opened, communication is established with the drain pipe 20 for the space 31 inside the cover 11 through the hole 62, thereby relieving the hydraulic pressure otherwise imposed on the stem plate 13. Obviously, very little water will flow out the drain in this relief of pressure, assuming there are no open faucets in the system. Consequently, there is no appreciable wasting of water. The valve 58 is normally held closed under action of a spring 69 which is disposed between the top of the stem plate and a washer 70 held against displacement from the upper end portion of the stem 61 by a cross-pin. A radial projection 71 on the plate 34 extends over the stem 61 of the valve 58, and in the closing of the shut-off valve 17 by downward movement of the stem 28 and plate 34, the projection 71 strikes the end of the stem 61 and opens the valve 58 against the action of the spring 69. The opening of the relief valve 58 is, therefore, concurrent with the closing of the shut-off valve 17, and vice versa.

In Fig. 2 I have shown a pilot valve 56' that is arranged to be operated automatically in the operation of the hand lever 40' preliminary to the turning of the stem 39', whereby to eliminate the necessity for operating a separate hand valve like the valve 56, which a careless or uninitiated operator might fail to do. The hand lever 40' is pivotally connected to the stem 39 and 41' and has a forked end 72 straddling the annularly grooved head 73 provided on the outer end of the stem 74 of the pilot valve 56'. The latter is reciprocable in a bore 75 provided in the stem 39' and has an L-shaped passage 76 provided therein, the upper end of which is shown in communication with a port 77 in the stem 39' which communicates at all times with an atmospheric vent pipe 78, whereby to place the diaphragm chamber 53 of the pressure-operable diaphragm mechanism that is connected with the lower end of the stem 39' under atmospheric pressure. This is the normal operative position of the valve, and the lever 40' under these conditions may be entered in a notch 42 in an index plate 14, similarly as the lever 40 in Fig. 1. Then when the operator wants to turn the valve from one operative position to another, the pilot valve 56' will automatically be shifted downwardly as the lever 40' is raised to disengage it from the notch 42. As a result, the passage 76 is placed in communication with another port 79 provided in the stem 39' which communicates at all times with a pipe 80 connected with the raw water supply pipe, whereby water under pressure is delivered to the diaphragm chamber 53 to close the shut-off valve 17 and open the relief valve 58, similarly as in the operation of the valve shown in Fig. 1. Here again it will be understood that I may, in some installations, find it more convenient to use compressed air, or some other fluid under pressure, instead of water under pressure from the raw water supply pipe. The stem 39' extends through a stuffing box 81 provided on the top of the cover 11' and is connected inside the cover to the back plate 51 of the pressure-operable diaphragm mechanism, similarly as in Fig. 1, the bore 75 of the stem 39' being in communication with the diaphragm chamber 53 of said mechanism. The pilot valve 56' is normally held in the upper position in engagement with an annular shoulder 82 provided in the reduced upper end portion of the bore 75, a coiled compression spring 83 being provided between the head end 73 of the stem 74 and the upper end of the stem 39' for that purpose, the spring thereby serving the double purpose of holding the valve 56' in the raised position and holding the hand lever 40' engaged in its notch 42 in the index plate.

The valve embodying this control and operating means shown in Fig. 2, it will, of course, be understood, will be otherwise generally of the same construction as the valve shown in Fig. 1.

It is believed the foregoing description conveys a good understanding of the objects and advantages of my invention. The appended claims have been drawn to cover all legitimate modifications and adaptations.

I claim:

1. In a plate type valve, the combination of a ported body member, a ported stem plate adapted to effect different communications between the ports in the body member in different positions of the plate, a cover on the body member enclosing the plate, a transverse wall in said cover separating the plate chamber from an atmospheric chamber, one of the ports in the body member being a pressure port and normally communicating with the plate chamber, an upstanding neck portion on the body member surrounding the pressure port and projecting upwardly through an opening in the stem plate and providing a valve seat on the outer end thereof, an operating stem reciprocable and rotatable in the wall in said cover in substantially coaxial relation with said neck portion, a plate on the inner end of said stem reciprocable and rotatable therewith, means providing a slidable operating connection between the latter plate and stem plate so as to permit endwise movement of the stem independently of the stem plate but cause rotation of the stem plate with the stem, a shut-off valve movable with the stem and the plate thereon toward and away from the seat on the upstanding neck, and means for reciprocating and rotating the stem comprising a manually rotatable stem having a slidable driving connection with the first stem, pressure fluid operable diaphragm means carried on the second stem in the atmospheric chamber in said cover and operatively connected with the first stem to reciprocate the same, and valve means connected with a source of pressure fluid supply and with a pressure fluid drain for controlling the release of pressure from the pressure fluid operable means to the drain and communication of said pressure fluid operable means with the source of pressure fluid supply.

2. A valve as set forth in claim 1, wherein another of the ports in the body member is a low pressure drain port, said valve including a pressure relief valve on the stem plate for establishing communication between said low pressure drain port and the plate chamber, and means operable by engagement with the plate on the first stem in the reciprocation thereof by the pressure fluid operable diaphragm means for opening said pressure relief valve.

3. In a plate type valve, the combination of a ported body member, a ported stem plate adapted to effect different communications between the ports in the body member in different positions of the plate, a cover on the body member enclosing the plate, a transverse wall in said cover separating the plate chamber from an atmospheric chamber, one of the ports in the body member being a pressure port and normally communicating with the plate chamber, an operating stem reciprocable and rotatable in the wall in said cover, a plate on the inner end of said stem reciprocable and rotatable therewith, means providing a slidable operating connection between the latter plate and stem plate so as to permit endwise movement of the stem independently of the stem plate but cause rotation of the stem plate with the stem, another of the ports in the body member being a low pressure drain port, a pressure relief valve on said stem plate for establishing communication between said low pressure drain port and the plate chamber, means operable by engagement with the plate on said stem upon reciprocation thereof for opening said relief valve, and means for reciprocating and rotating the stem comprising a manually rotatable stem having a slidable driving connection with the first stem, pressure fluid operable diaphragm means carried on the second stem in the atmospheric chamber in said cover and operatively connected with the first stem to reciprocate the same, and valve means connected with a source of pressure fluid supply and with a pressure fluid drain for controlling the release of pressure from the pressure fluid operable means to the drain and communication of said pressure fluid operable means with the source of pressure fluid supply.

4. In a plate type valve, the combination of a ported body member, a ported stem plate adapted to effect different communications between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate to transmit rotation thereto, a shut-off valve for closing a pressure port provided in the valve, means connected with the shut-off valve and operable by said diaphragm mechanism upon admission of pressure fluid to said mechanism for closing said shut-off valve, valve means connected with a source of pressure fluid supply and with a pressure fluid drain for controlling release of pressure from the pressure fluid operable means to the drain and communication of said mechanism with the source of pressure fluid supply, and means for turning said stem.

5. In a plate type valve the combination of a ported body member, a ported stem plate adapted to effect different communications between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate to transmit rotation thereto, a relief valve for opening the inside of said cover to a low pressure area, means connected with said diaphragm mechanism and operable upon admission of pressure fluid to said mechanism for opening said relief valve, valve means connected with a source of pressure fluid supply and with a pressure fluid drain for controlling release of pressure from the pressure fluid operable means to the drain and communication of said mechanism with the source of pressure fluid supply, and means for turning said stem.

6. In a plate type valve the combination of a ported body member, a ported stem plate adapted to effect different communications between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate to transmit rotation thereto, a pilot valve reciprocable with respect to said stem and connected with a source of pressure fluid supply and with a pressure fluid drain to control release of pressure from said diaphragm mechanism and communication of said diaphragm mechanism with the source of pressure fluid supply, a manually operable hand lever pivotally connected to said stem to turn the same and operatively connected with said pilot valve to shift the latter upon pivotal movement of said lever, a shut-off valve for closing a pressure port provided in the valve, and means for operating said shut-off valve connected with said diaphragm mechanism and operable upon admission of pressure fluid to said mechanism for closing said shut-off valve preliminary to the plate being turned.

7. In a plate type valve the combination of a ported body member, a ported stem plate adapted to effect different communications between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate to transmit rotation thereto, a pilot valve reciprocable with respect to said stem and connected with a source of pressure fluid supply and with a pressure fluid drain to control release of pressure from said diaphragm mechanism and communication of said diaphragm mechanism with the source of pressure fluid supply, a manually operable hand lever pivotally connected to said stem to turn the same and operatively connected with said pilot valve to shift the latter upon pivotal movement of said lever, a relief valve for opening the inside of said cover to a low pressure area, and means connected with said diaphragm mechanism and operable upon admission of pressure fluid to said mechanism to open said relief valve preliminary to the plate being turned.

8. A valve as set forth in claim 3, including a shut-off valve movable with the stem toward and away from the pressure port.

9. In a plate type valve, the combination of a ported body member, a ported stem plate adapted to effect different communications between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate to transmit rotation thereto, a shut-off valve for closing a pressure port provided in the valve, means connected with the shut-off valve and operable by said diaphragm mechanism upon admission of pressure fluid to said mechanism for closing said shut-off valve, a relief valve for opening the inside of said cover to a low pressure area, means connected with said diaphragm mechanism and operable upon admission of pressure fluid to said mechanism for opening said relief valve, valve means connected with a source of pressure fluid supply and with a pressure fluid drain for controlling release of pressure from the pressure fluid operable means to the drain and communication of said mechanism with the source of pressure fluid supply, and means for turning said stem.

10. In a plate type valve, the combination of a ported body member, a ported stem plate adapted to effect different communications between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate to transmit rotation thereto, a pilot valve reciprocable with respect to said stem and connected with a source of fluid supply and with a pressure fluid drain to control release of pressure from said diaphragm mechanism and communication of said diaphragm mechanism with the source of pressure fluid supply, a manually operable hand lever pivotally connected to said stem to turn the same and operatively connected with said pilot valve to shift the latter upon pivotal movement of said lever, a shut-off valve for closing a pressure port provided in the valve, means connected with the shut-off valve and operable by said diaphragm mechanism upon admission of pressure fluid to said mechanism for closing said shut-off valve, a relief valve for opening the inside of said cover to a low pressure area, and means connected with said diaphragm mechanism and operable upon admission of pressure fluid to said mechanism to open said relief valve preliminary to the plate being turned.

11. In a plate type valve, the combination of a ported body member, a ported stem plate adapted to effect different communications between the ports in the body member in different positions of the plate, a cover on the body member enclosing the plate, a rotatable stem extending into said cover, a plate for supporting a pressure-operable diaphragm mounted by its central portion on said stem inside said cover for rotation with the stem, a pressure-operable diaphragm secured by its outer marginal portion to said plate and defining with said plate a diaphragm chamber, a second plate secured to and movable with the central portion of said diaphragm carrying a second stem having a telescoping driving connection with the first-mentioned stem and operatively connected with said stem plate to transmit rotation thereto, a shut-off valve for closing a pressure port provided in the valve, means connected with the shut-off valve and operable by said second stem upon admission of pressure fluid to said diaphragm chamber for closing said shut-off valve, valve means connected with a source of pressure fluid supply and with a pressure fluid drain for controlling release of pressure from the pressure fluid operable means to the drain and communication of said mechanism with the source of pressure fluid supply, and means for turning said first-mentioned stem.

12. In a plate type valve, the combination of a ported body member, a ported stem plate adapted to effect different communications between the ports in the body member in different positions of the plate, a cover on the body member enclosing the plate, a rotatable stem extending into said cover, a plate for supporting a pressure-operable diaphragm mounted by its central portion on said stem inside said cover for rotation with the stem, a pressure-operable diaphragm secured by its outer marginal portion to said plate and defining with said plate a diaphragm chamber, a second plate secured to and movable with the central portion of said diaphragm carrying a second stem having a telescoping driving connection with the first-mentioned stem and operatively connected with said stem plate to transmit rotation thereto, a shut-off valve for closing a pressure port provided in the valve, means connected with the shut-off valve and operable by said second stem upon admission of pressure fluid to said diaphragm chamber for closing said shut-off valve, a relief valve for opening the inside of said cover to a low pressure area, means connected with said second stem and operable upon admission of pressure fluid to said diaphragm chamber for opening said relief valve, valve means connected with a source of pressure fluid supply and with a pressure fluid drain for controlling release of pressure from the pressure fluid operable means to the drain and communication of said mechanism with the source of pressure fluid supply, and means for turning said first-mentioned stem.

13. In a plate type valve, the combination of a ported body member, a ported stem plate adapted to effect different communications between the ports in the body member in different positions of the plate, a cover on the body member enclosing the plate, a rotatable stem extending into said cover, a plate for supporting a pressure-operable diaphragm mounted by its central portion on said stem inside said cover for rotation with the stem, a pressure-operable diaphragm secured by its outer marginal portion to said plate and defining with said plate a diaphragm chamber, a second plate secured to and movable with the central portion of said diaphragm carrying a second stem having a telescoping driving connection with the first-mentioned stem and operatively connected with said stem plate to transmit rotation thereto, a relief valve for opening the inside of said cover to a low pressure area, means connected with said second stem and operable upon admission of pressure fluid to said diaphragm chamber for opening said relief valve, valve means connected with a source of pressure fluid supply and with a pressure fluid drain for controlling release of pressure from the pressure fluid operable means to the drain and communication of said mechanism with the source of pressure fluid supply, and means for turning said first-mentioned stem.

14. In a plate type valve, the combination of a ported body member, a ported stem plate adapted to effect different communications between the ports in the body member in different positions of the plate, a cover on the body member enclosing the plate, a rotatable stem extending into said cover, a plate for supporting a pressure-operable diaphragm mounted by its central portion on said stem inside said cover for rotation with the stem, a pressure-operable diaphragm secured by its outer marginal portion to said plate and defining with said plate a diaphragm chamber, a second plate secured to and movable with the central portion of said diaphragm carrying a second stem having a telescoping driving connection with the first-mentioned stem and operatively connected with said stem plate to transmit rotation thereto, a pilot valve reciprocable with respect to said first-mentioned stem and connected with a source of fluid supply and with a pressure fluid drain to control release of pressure from said diaphragm chamber and communication of said diaphragm chamber with the source of pressure fluid supply, a manually operable hand lever pivotally connected to said first-mentioned stem to turn the same and operatively connected with said pilot valve to shift the latter upon pivotal movement of said lever, a shut-off valve for closing a pressure port provided in the valve, and means for operating said shut-off valve connected with said second stem and operable upon admission of pressure fluid to said diaphragm chamber for closing said shut-off valve preliminary to the plate being turned.

15. In a plate type valve, the combination of a ported body member, a ported stem plate adapted to effect different communications between the ports in the body member in different positions of the plate, a cover on the body member enclosing the plate, a rotatable stem extending into said cover, a plate for supporting a pressure-operable diaphragm mounted by its central portion on said stem inside said cover for rotation with the stem, a pressure-operable diaphragm secured by its outer marginal portion to said plate and defining with said plate a diaphragm chamber, a second plate secured to and movable with the central portion of said diaphragm carrying a second stem having a telescoping driving connection with the first-mentioned stem and operatively connected with said stem plate to transmit rotation thereto, a pilot valve reciprocable with respect to said stem and connected with a source of fluid supply and with a pressure fluid drain to control release of pressure from said diaphragm chamber and communication of said diaphragm chamber with the source of pressure fluid supply, a manually operable hand lever pivotally connected to said first-mentioned stem to turn the same and operatively connected with said pilot valve to shift the latter upon pivotal movement of said lever, a relief valve for opening the inside of said cover to a low pressure area, and means connected with said second stem and operable upon admission of pressure fluid to said diaphragm chamber to open said relief valve preliminary to the plate being turned.

16. In a plate type valve, the combination of a ported body member, a ported stem plate adapted to effect different communications between the ports in the body member in different positions of the plate, a cover on the body member enclosing the plate, a rotatable stem extending into said cover, a plate for supporting a pressure-operable diaphragm mounted by its central portion on said stem inside said cover for rotation with the stem, a pressure-operable diaphragm secured by its outer marginal portion to said plate and defining with said plate a diaphragm chamber, a second plate secured to and movable with the central portion of said diaphragm carrying a second stem having a telescoping driving connection with the first-mentioned stem and operatively connected with said stem plate to transmit rotation thereto, a pilot valve reciprocable with respect to said stem and connected with a source of fluid supply and with a pressure fluid drain to control release of pressure from said diaphragm chamber and communication of said diaphragm chamber with the source of pressure fluid supply, a manually operable hand lever pivotally connected to said first-mentioned stem to turn the same and operatively connected with said pilot valve to shift the latter upon pivotal movement of said lever, a shut-off valve for closing a pressure port provided in the valve, means connected with the shut-off valve and operable by said second stem upon admission of pressure fluid to said diaphragm chamber for closing said shut-off valve, a relief valve for opening the inside of said cover to a low pressure area, and means connected with said second stem and operable upon admission of pressure fluid to said diaphragm chamber to open said relief valve preliminary to the plate being turned.

HARRY MANSEN.

References Cited in the file of this patent

UNITED STATES PATENTS

| Number | Name | Date |
|---|---|---|
| Re. 23,076 | Pick | Jan. 11, 1949 |
| 1,988,957 | Newell | Jan. 22, 1935 |
| 2,047,131 | Riche | July 7, 1936 |
| 2,093,692 | Daniels | Sept. 21, 1937 |
| 2,209,993 | McGill | Aug. 6, 1940 |
| 2,235,287 | Daniels | Mar. 18, 1941 |
| 2,262,224 | Daniels | Nov. 11, 1941 |
| 2,328,008 | Griswold | Aug. 31, 1943 |
| 2,398,437 | McGill | Apr. 16, 1946 |
| 2,428,410 | Daniels | Oct. 7, 1947 |